United States Patent
Ooba

(10) Patent No.: US 10,780,579 B2
(45) Date of Patent: Sep. 22, 2020

(54) WORK ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 134 days.

(21) Appl. No.: 16/245,573

(22) Filed: Jan. 11, 2019

(65) Prior Publication Data

US 2019/0232491 A1    Aug. 1, 2019

(30) Foreign Application Priority Data

Feb. 1, 2018  (JP) ................. 2018-016765

(51) Int. Cl.
  *B25J 9/00*    (2006.01)
  *B25J 9/16*    (2006.01)

(52) U.S. Cl.
  CPC ........... *B25J 9/1633* (2013.01); *B25J 9/0093* (2013.01); *B25J 9/1664* (2013.01); *B25J 9/1694* (2013.01)

(58) Field of Classification Search
  CPC ...... B25J 9/1633; B25J 9/1664; B25J 9/1694; B25J 9/0093; B25J 9/1687; B25J 9/1674; B25J 9/1697; B25J 13/085; B65G 47/905; B65G 2203/042; G05B 2219/45064; G05B 2219/39542; G05B 2219/39505; G05B 2219/39319; G05B 2219/39102;
  (Continued)

(56) References Cited

U.S. PATENT DOCUMENTS

2010/0094453 A1    4/2010  Nishihara et al.
2013/0199010 A1*   8/2013  Osato .................. B23Q 1/00
                                                    29/283
(Continued)

FOREIGN PATENT DOCUMENTS

JP    S49-103358 A    9/1974
JP    S61-243514      10/1986
(Continued)

OTHER PUBLICATIONS

Japanese Office Action dated Jan. 21, 2020, in connection with corresponding JP Application No. 2018-016765 (7 pgs., including machine-generated English translation).
(Continued)

*Primary Examiner* — Dalena Tran
(74) *Attorney, Agent, or Firm* — Maier & Maier, PLLC

(57) ABSTRACT

A work robot system including a conveying apparatus that conveys an object in one direction; a robot that performs a predetermined task on a target portion of the object being conveyed by the conveying apparatus, a movement amount detector that sequentially detects the movement amount of the object moved by the conveying apparatus, and a force detector that detects a force generated by contact between a tool supported by the robot and the object. Then, when the predetermined task is performed, a controller performs force control based on a value detected by the force detector while performing control of the robot by use of information about the position of the target portion and a value detected by the movement amount detector.

5 Claims, 5 Drawing Sheets

(58) Field of Classification Search
CPC ........... G05B 2219/40586; G05B 2219/39529;
G05B 2219/39484
USPC ....... 700/245, 260, 259, 261, 213, 228, 275;
901/1, 10, 46; 29/283
See application file for complete search history.

(56) References Cited

U.S. PATENT DOCUMENTS

| | | | | |
|---|---|---|---|---|
| 2013/0293701 | A1* | 11/2013 | Tani | G01B 11/002 |
| | | | | 348/135 |
| 2014/0025205 | A1* | 1/2014 | Inazumi | B25J 9/1633 |
| | | | | 700/258 |
| 2017/0334662 | A1* | 11/2017 | Burk | B65G 47/38 |

FOREIGN PATENT DOCUMENTS

| | | |
|---|---|---|
| JP | H05-318363 A | 12/1993 |
| JP | H08-72764 A | 3/1996 |
| JP | H08-286701 A | 11/1996 |
| JP | H09-72717 A | 3/1997 |
| JP | 2011-073128 A | 4/2011 |

OTHER PUBLICATIONS

Japanese Search Report dated Jan. 14, 2020, in connection with corresponding JP Application No. 2018-016765 (27 pgs., including machine-generated English translation).
U.S. Appl. No. 16/245,593, Masafumi Ooba, filed Jan. 11, 2019.

* cited by examiner

WORK ROBOT SYSTEM

CROSS-REFERENCE TO RELATED APPLICATIONS

This application is based on and claims priority to Japanese Patent Application No. 2018-016765 filed on Feb. 1, 2018, the entire content of which is incorporated herein by reference.

FIELD

The present invention relates to a work robot system.

BACKGROUND

When a part is assembled to an object being transferred by a conveying apparatus, the conveying apparatus is stopped and static in many conventional cases. In particular, when a part is precisely assembled to a large object such as a vehicle body, transferring of the object by the conveying apparatus needs to be stopped and static. This results in deterioration of the working efficiency in some cases.

Meanwhile, a production line including a robot, a conveying apparatus for transferring an object, a rail provided along the conveying apparatus, and a moving apparatus for moving the robot along the rail, has been known (for example, see Japanese Unexamined Patent Application, Publication No. H08-72764). In such a production line, the robot performs defect inspection and polishing on the object when the object is being transferred by the conveying apparatus. In addition, when the defect inspection and polishing are being performed, the moving apparatus moves the robot along the rail at the same speed as a speed at which the conveying apparatus is transferring the object.

SUMMARY

A work robot system according to one aspect of the present invention includes a conveying apparatus that conveys an object; a robot that performs a predetermined task on a target portion of the object being conveyed by the conveying apparatus; a controller that controls the robot; a movement amount detector that detects a movement amount of the object moved by the conveying apparatus; and a force detector that detects a force generated by contact between a part or a tool supported by the robot and the object, wherein when the predetermined task is performed by the robot, the controller performs force control based on a value detected by the force detector while performing control of the robot by using information about a position of the target portion and a value detected by the movement amount detector.

DETAILED DESCRIPTION

Hereinafter, a work robot system 1 according to one embodiment of the present invention will be described with reference to the drawings.

Figure 1:
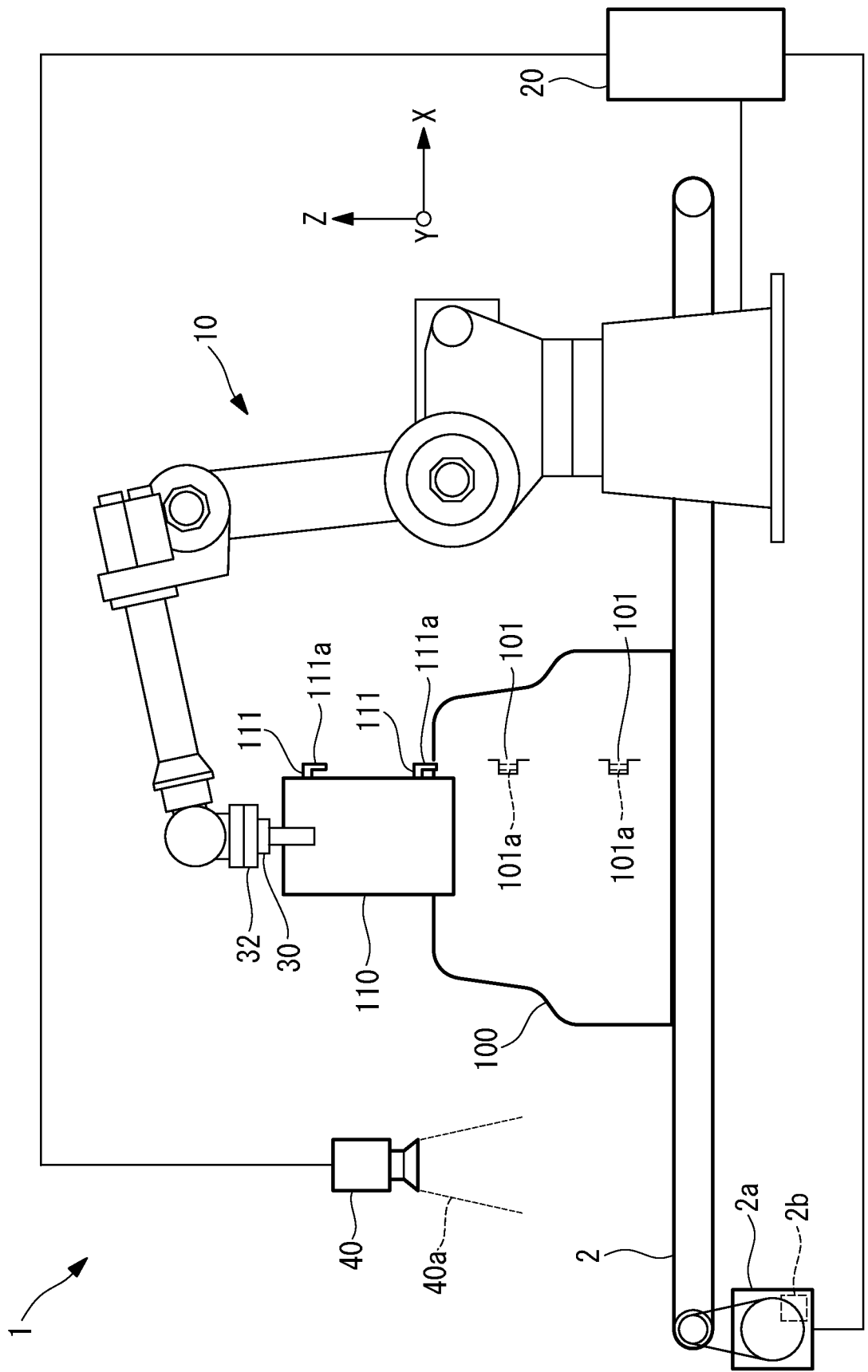
FIG. 1 is a schematic configuration diagram of a work robot system according to an embodiment of the present invention.

As illustrated in FIG. 1, the work robot system 1 of the present embodiment includes a conveying apparatus 2 that conveys an object 100 which is a target to be processed, a robot 10 that performs a predetermined task on a target portion 101 of the object 100 being transferred by the conveying apparatus 2, a control apparatus 20 that controls the robot 10, and a detection apparatus 40 that serves as a detector.

Figure 3:
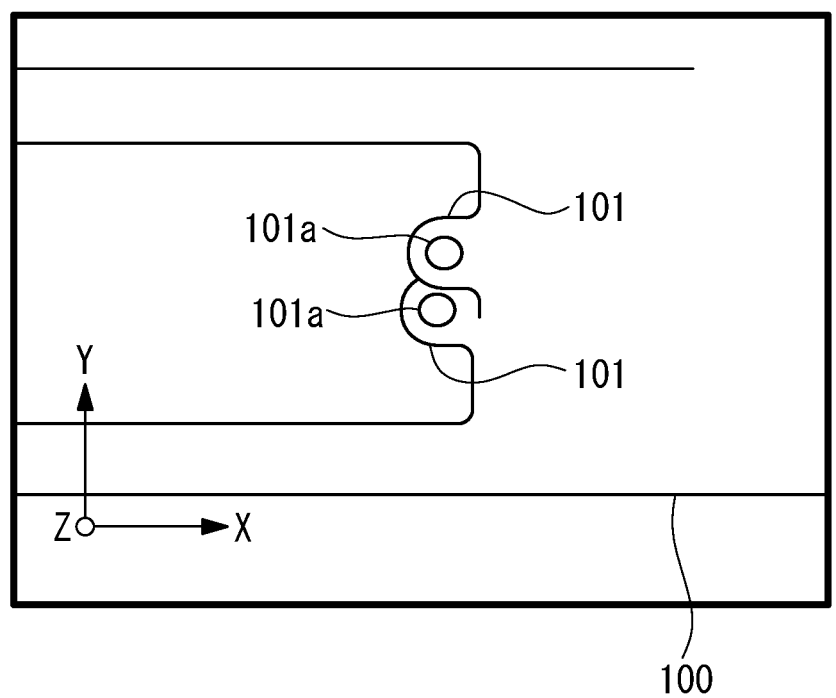
FIG. 3 is an example of image data taken by a sensor of the work robot system according to the present embodiment.

The detection apparatus 40 acquires data by which the position and the orientation of the target portion 101 of the object 100 being transferred by the conveying apparatus 2 can be specified. Any apparatus having this function can be used as the detection apparatus 40. For example, the detection apparatus 40 is a two-dimensional camera, a three-dimensional camera, a three-dimensional distance sensor, or a sensor that measures the shape of an object by irradiating the object with line light. The detection apparatus 40 of the present embodiment is a two-dimensional camera attached to a position above the conveying apparatus 2. In the state where the target portions 101 are within a predetermined range of a field angle 40a, the detection apparatus 40 acquires image data of the target portions 101 as shown in FIG. 3. The detection apparatus 40 transmits the image data to the control apparatus 20. By the image data, the position of at least either one of the two target portions 101 can be specified. Further, the orientations of the target portions 101 can be specified on the basis of the positional relationship between the two target portions 101 in the image data.

The object 100 is not limited to a particular type. In the present embodiment, however, the object 100 is a vehicle body as one example. The conveying apparatus 2 conveys the object 100 in one direction by driving a motor 2a. In the present embodiment, the conveying apparatus 2 conveys the object 100 to the right side in FIG. 1. The motor 2a includes an operation position detection device 2b. The operation position detection device 2b sequentially detects the rotation position and the rotation amount of an output shaft of the motor 2a. For example, the operation position detection device 2b is an encoder. A value detected by the operation position detection device 2b is transmitted to the control apparatus 20.

In the present embodiment, the operation position detection device 2b is directly connected to the motor. However, a roller may be attached to a rotary shaft of the encoder so as to be pressed against a belt part on the upper portion of the conveying apparatus 2 so that the rotation amount is sequentially detected.

The target portion 101 is a portion in the object 100 on which the robot 10 performs a predetermined task. In the present embodiment, raising of a part 110 by means of a hand 30 of the robot 10, and attachment of an attachment portion 111 of the part 110 to the target portion 101 by means of the robot 10 are performed in the predetermined task. Consequently, for example, a shaft 111a extending downwardly from the attachment portion 111 of the part 110 is fitted into a hole 101a that is provided in the target portion 101 of the object 100.

Note that, in a state where the object 100 is being moved in one direction by the conveying apparatus 2, the robot 10 attaches the attachment portion 111 of the part 110 to the target portion 101.

The robot 10 is not limited to a particular type. However, the robot 10 of the present embodiment includes a plurality of servomotors 11 that respectively drive a plurality of movable parts (see FIG. 2). The servomotors 11 each have an operation position detection device for detecting an operation position thereof. One example of the operation position detection device is an encoder. A value detected by the operation position detection device is transmitted to the control apparatus 20.

The hand 30 is attached to an end portion of the robot 10. The hand 30 of the present embodiment supports the part 110 by gasping the part 110 by means of a plurality of claws. Alternatively, a hand which supports the part 110 by using a magnetic force, air suction, or the like, may be used.

Figure 2:
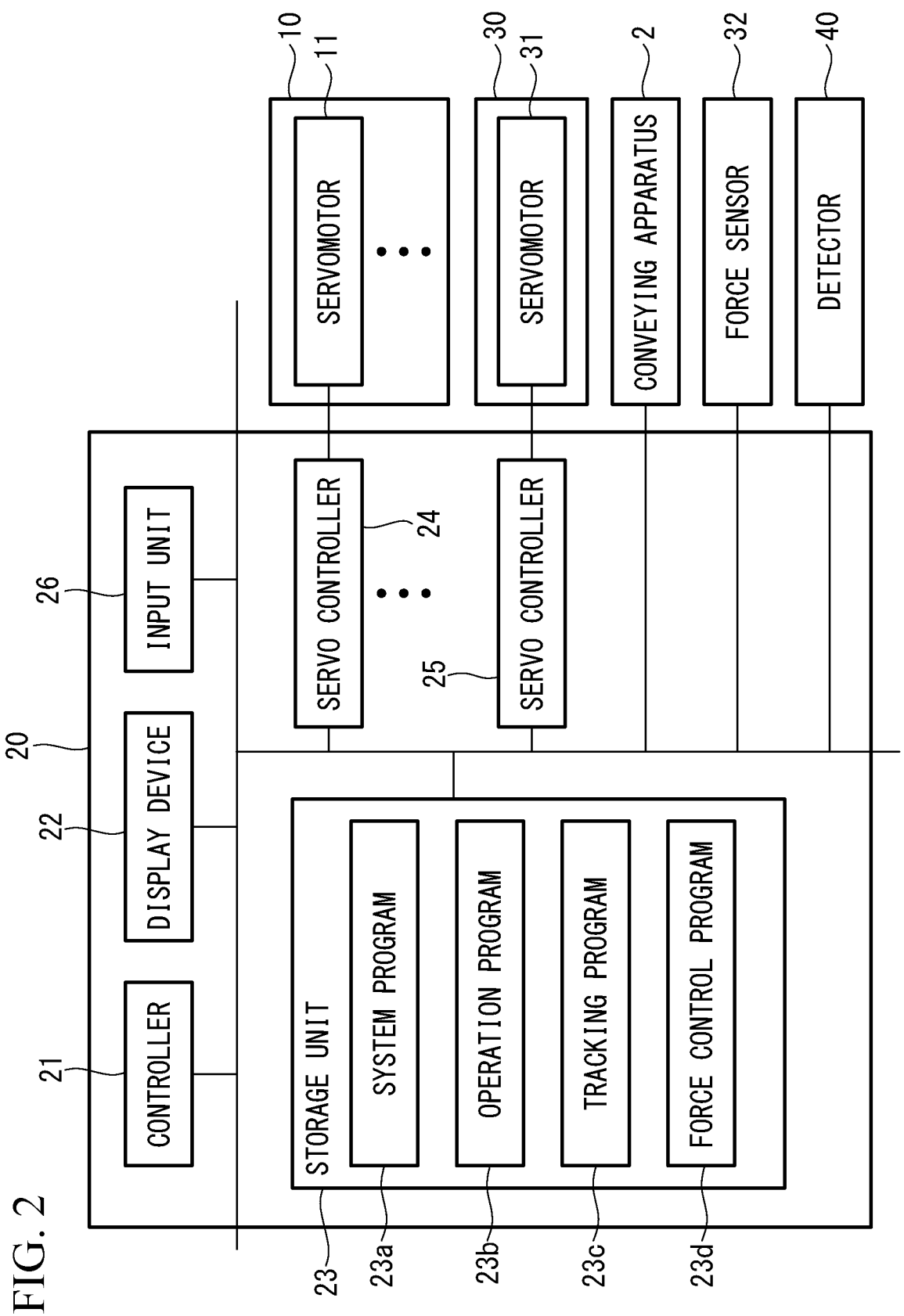
FIG. 2 is a block diagram of a control apparatus of the work robot system according to the present embodiment.

The hand 30 includes a servomotor 31 that drives the claws (see FIG. 2). The servomotor 31 has an operation position detection device for detecting an operation position thereof. One example of the operation position detection device is an encoder. A value detected by the operation position detection device is transmitted to the control apparatus 20.

Note that various types of servomotors such as rotary motors or linear motion motors, may be used as the servomotors 11, 31.

A force sensor 32 is attached to the end portion of robot 10. The force sensor 32 detects forces in an X-axis direction, a Y-axis direction, and a Z-axis direction shown in FIG. 1 and forces around the X-axis direction, the Y-axis direction, and the Z-axis direction, for example. Any sensor may be used as the force sensor 32 as long as the sensor can detect the direction of a force applied to the hand 30 or to the part 110 grasped by the hand 30, and detect the magnitude of the force. Therefore, the force sensor 32 is provided between the robot 10 and the hand 30 in the present embodiment. However, the force sensor 32 may be provided in the hand 30.

As illustrated in FIG. 2, the control apparatus 20 includes a controller 21 having a CPU or a RAM, etc., a display device 22, a storage unit 23 having a nonvolatile storage or a ROM, etc., a plurality of servo controllers 24 respectively corresponding to the servomotors 11 of the robot 10, a servo controller 25 corresponding to the servomotor 31 of the hand 30, and an input unit 26 connected to the control apparatus 20. In one example, the input unit 26 is an input device such as an operation panel that can be carried about by an operator. The input unit 26 performs wireless communication with the control apparatus 20 in some cases.

A system program 23a is stored in the storage unit 23. The system program 23a has the basic function of the control apparatus 20. Further, an operation program 23b is stored in the storage unit 23. Moreover, a tracking program 23c and a force control program 23d are stored in the storage unit 23.

Figure 4:
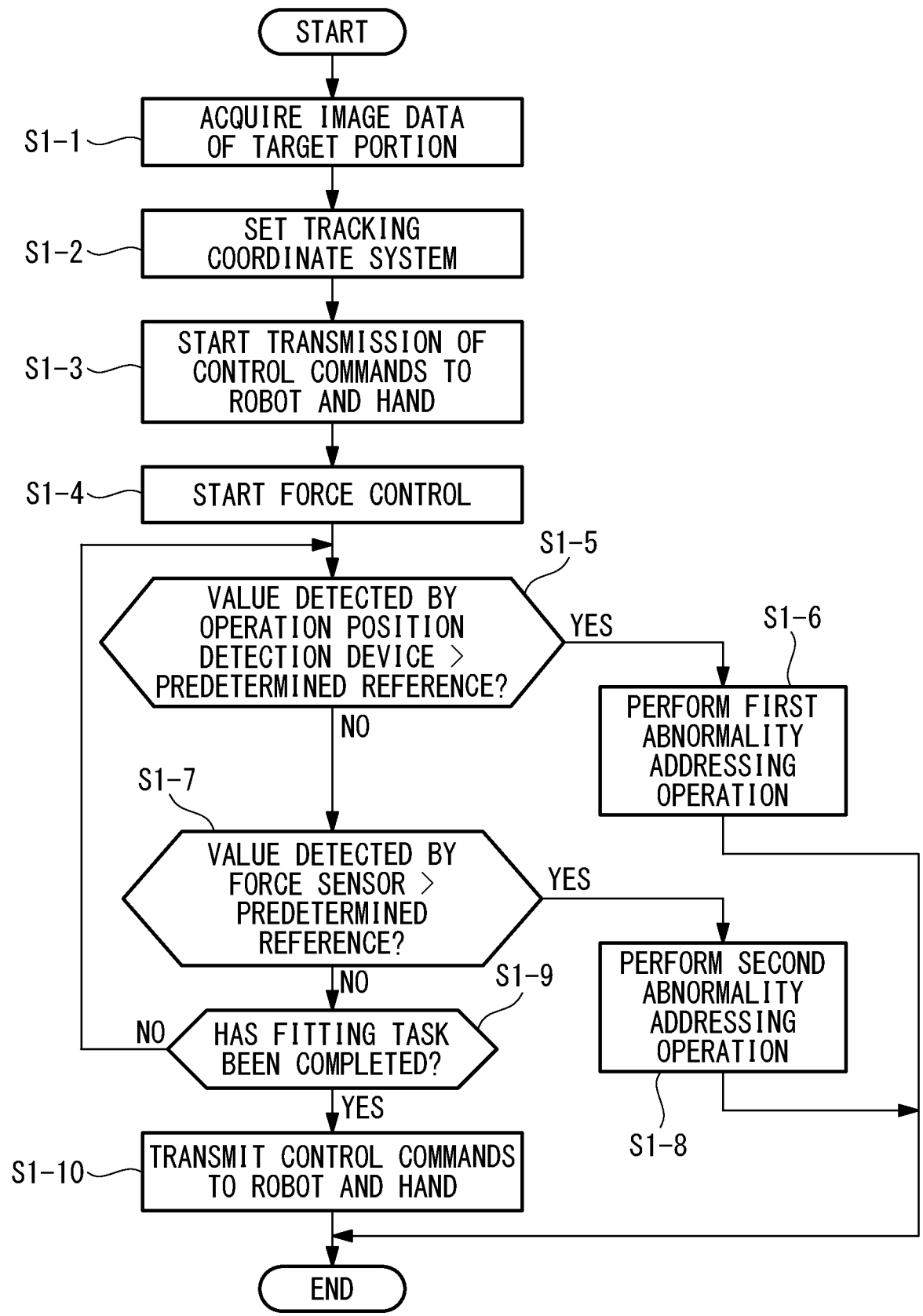
FIG. 4 is a flowchart showing operation of a controller of the work robot system according to the present embodiment.

The controller 21 transmits, on the basis of these programs, control commands for performing the predetermined task on the object 100 to each of the servo controllers 24, 25. Accordingly, the robot 10 and the hand 30 perform the predetermined task on the object 100. This operation of the controller 21 will be described with reference to a flowchart in FIG. 4.

First, the controller 21 acquires, from the detection apparatus 40, the image data of the target portion 101 as shown in FIG. 3 on the basis of the tracking program 23c (step S1-1). Further, by using a value e1 detected by the operation position detection device 2b when the detection apparatus 40 has taken the image data, and a value e2 detected by the operation position detection device 2b at the current time, the controller 21 sets a tracking coordinate system that moves together with the object 100 on the conveying apparatus 2 (step S1-2).

Figure 5:
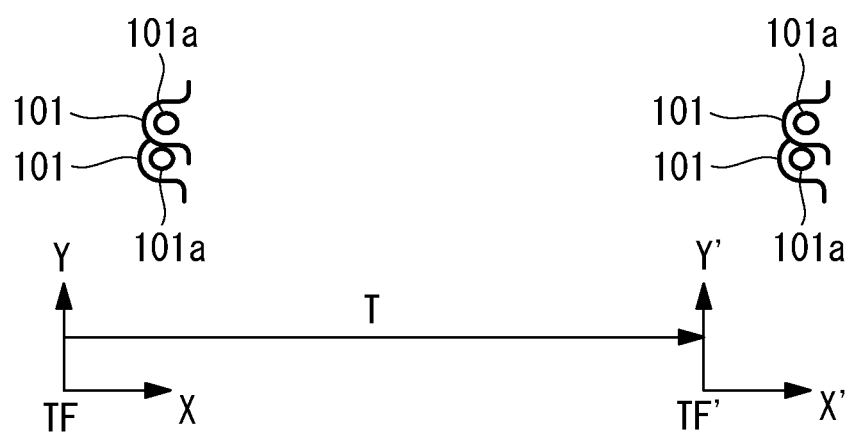
FIG. 5 is an explanatory diagram of a coordinate system of tracking control in the work robot system according to the present embodiment.

One example of the tracking coordinate system is shown in FIG. 5. TF represents the tracking coordinate system obtained at a time point when the image data of the target portion 101 has been taken by the detection apparatus 40. As shown in FIG. 5, the tracking coordinate system TF has information about the positions and the orientations of the holes 101a in the target portions 101. TF' represents the current tracking coordinate system. As shown in FIG. 5, the current tracking coordinate system TF' also has information about the positions and the orientations of the holes 101a in the target portions 101. That is, the target portions 101 each have the same position and orientation information with respect to both the tracking coordinate systems TF, TF'.

The tracking coordinate system TF' can be obtained by use of a coordinate conversion determinant T, as expressed by expression (1):

$$TF' = T \cdot TF \qquad (1).$$

A movement component can be obtained by use of expression (2):

$$(e2-e1)/S \qquad (2).$$

S represents the ratio of the count at the operation position detection device 2b which is an encoder to the movement amount of the object 100 moved by the conveying apparatus 2.

That is, when S is 1, the value detected by the operation position detection device 2b is equal to the movement amount of the object 100 moved by the conveying apparatus 2. Accordingly, the operation position detection device 2b functions as a movement amount detector. On the other hand, when S is not 1, the operation position detection device 2b and the controller 21 function as the movement amount detectors.

Next, the controller 21 starts to transmit control commands to the robot 10 and the hand 30 on the basis of the operation program 23c (step S1-3). As a result, the part 110 is grasped by the hand 30, the part 110 grasped by the hand 30 is moved toward the object 100 on the conveying apparatus 2. Thereafter, the shaft 111a of the part 110 is fitted into the hole 101a of the object 100.

Further, at step S1-3, the controller 21 uses, as a reference coordinate system for the robot 10 that operates on the basis of the operation program 23c, the tracking coordinate system TF' set at step S1-2. For example, with respect to the reference coordinate system, a coordinate system the origin point of which is set to a tool center point (TCP) of the hand 30, a coordinate system the origin point of which is set to a reference position of the part 110, or the like, is expressed.

Therefore, the reference coordinate system for the robot 10 moves in the conveying direction of the conveying apparatus 2, and the movement of the reference coordinate system matches with movement of the object 100 by the conveying apparatus 2. In this state, the target portion 101 of the object 100 is moved by the conveying apparatus 2, but, when viewed from the controller 21, the target portion 101 stops in the reference coordinate system. Therefore, the controller 21 can stably cause the end portion of the robot 10 to follow the target portion 101.

Next, when the part 110 has reached at a fitting position and a fitting orientation, as illustrated in FIG. 1, for example, the controller 21 starts force control on the basis of the force control program 23d (step S1-4). As the force control, well-known force control can be used. In the present embodiment, the robot 10 moves the part 110 in a direction away from a force detected by the force sensor 32. The movement amount in this case is determined by the controller 21 according to the value detected by the force sensor 32.

For example, when a force in a direction opposite to the conveying direction of the conveying apparatus 2 is detected by the force sensor 32 after the fitting of the shaft 111*a* of the part 110 grasped by the hand 30 into the hole 101*a* of the object 100 is started, the robot 10 slightly moves the part 110 in the direction opposite to the conveying direction in the reference coordinate system during the following control, so as to escape from the detected force.

Next, when the value detected by the operation position detection device 2*b* of the motor 2*a* of the conveying apparatus 2 varies to exceed a predetermined reference (step S1-5), the controller 21 performs a first abnormality addressing operation (step S1-6). Examples of the variation exceeding the predetermined reference include acceleration/deceleration exceeding the predetermined reference and rotational vibration exceeding the predetermined reference. When supplied power is not stable, the rotation speed of the motor 2*a* may abruptly decrease, and the rotation speed of the motor 2*a* may greatly vary. In these cases, variation of the value detected by the operation position detection device 2*b* exceeds the predetermined reference.

The controller 21 performs, as the first abnormality addressing operation, an operation of shortening the control cycle of force control, an operation of enhancing the sensitivity, an operation of stopping progression of the fitting, an operation of giving up the fitting task, or the like. When the control cycle of force control is shortened, or when the sensitivity is enhanced, the robot 10 can be more sensitively moved with respect to a force applied to the part 110. In the present embodiment, the controller 21 performs an operation of giving up the fitting task, an operation of stopping the conveying apparatus, a combination of these operations, or the like.

In addition, when the value detected by the force sensor 32 exceeds a predetermined reference value (step S1-7), the controller 21 performs a second abnormality addressing operation (step S1-8). When the value detected by the force sensor 32 exceeds the predetermined reference value, it is highly likely that an abnormal force is applied to the part 110 or the object 100, etc. Therefore, the controller 21 performs, as the second abnormality addressing operation, an operation of stopping the robot 10, an operation of moving the robot 10 at low speed in a direction away from the direction of the force detected by the force sensor 32, an operation of stopping the conveying apparatus, a combination of these operations, or the like. In the present embodiment, the controller 21 performs the operation of stopping the robot 10.

Meanwhile, the controller 21 determines whether or not the fitting task has been completed (step S1-9). When the fitting task has been completed, the controller 21 transmits control commands to the robot 10 and the hand 30 (step S1-10). Consequently, the hand 30 leaves the part 110, and the hand 30 is moved by the robot 10 to a standby position or a location where the next part 110 is stocked.

As described above, in the present embodiment, the robot 10 is controlled by use of the information about the position of the target portion 101 in the object 100 on the conveying apparatus 2 and the detected value of the movement amount of the object 100 moved by the conveying apparatus 2. Accordingly, even in a state where no force control is performed, the controller 21 can recognize the positional relationship between the part 110 supported by the robot 10 and the object 100, and, in some cases, can recognize the presence/absence of contact therebetween. For example, in the state where no force control is performed, an abnormality in the conveying apparatus 2 in which the movement amount of the object 100 moved by the conveying apparatus 2 greatly varies, can be recognized by the controller 21. Consequently, prevention of any damage to the robot 10, the conveying apparatus 2, the object 100, and the like can be implemented without the necessity of forcibly shortening the control cycle of force control or enhancing the sensitivity. Also, occurrence of oscillation of the robot 10 can be suppressed.

Also, in the present embodiment, the controller 21 moves, in the conveying direction of the conveying apparatus 2, the coordinate system having information about the position of the target portion 101 according to the value detected by the operation position detection device 2*b*, and the controller 21 performs force control by using the value detected by the force sensor 32 while causing the part 110 on the robot 10 to follow the target portion 101 by use of the coordinate system being moved.

As described above, the coordinate system having information about the position of the target portion 101 is moved according to the movement amount of the object 100 moved by the conveying apparatus 2, and the robot 10 is controlled by use of the coordinate system being moved. Accordingly, the controller 21 can easily, reliably cause the part 110 supported by the robot 10 to follow the target portion 101. Consequently, when the robot 10 performs the predetermined task, the controller 21 can precisely control the position and the orientation of the part 110 supported by the robot 10, with respect to the target portion 101 of the object 100 being transferred by the conveying apparatus 2. This brings an advantage for prevention of any damage to the robot 10, the conveying apparatus 2, the object 100, and the like, without involving shortening of the control cycle of force control or enhancement of the sensitivity, and also brings an advantage for suppression of occurrence of oscillation of the robot 10.

Further, in the present embodiment, the detection apparatus 40 that detects the position and the orientation of the target portion 101 in the object 100 on the conveying apparatus 2 is included, and the controller 21 sets the coordinate system having information about the position of the target portion 101, by using the detection result by the detection apparatus 40.

In the present embodiment, the detection apparatus 40 is a two-dimensional camera. Accordingly, the detection result by the detection apparatus 40 is image data. The controller 21 sets the coordinate system having information about the position and the orientation of the target portion 101 by using the image data. That is, the controller 21 sets the origin and the direction of the coordinate system, with respect to the target portion 101 in the image data. That is, the position and the orientation of the target portion 101 are fixed with respect to the coordinate system. When the coordinate system is set in this way, the position and the orientation of the part 110 supported by the robot 10 are precisely controlled with respect to the target portion 101 being moved.

In the present embodiment, when variation of the value detected by the operation position detection device 2*b* exceeds the predetermined reference, the controller 21 performs an abnormality addressing operation.

That is, in a state where the positional relationship between the part 110 supported by the robot 10 and the object 100 has been recognized as described above, the controller 21 further performs an abnormality addressing operation on the basis of the value detected by the operation position detection device 2b. This configuration brings an advantage for reliable prevention of any damage to the robot 10, the conveying apparatus 2, the object 100, and the like, and also brings an advantage for suppression of occurrence of oscillation of the robot 10.

Note that a processing tool may be supported by the end portion of the robot 10, and the robot 10 may perform processing, as the predetermined task, on the object 100 being transferred by the conveying apparatus 2. In this case, the processing tool is a drill, a milling cutter, a drill tap, a deburring tool, or any other tool. Also in this case, the processing tool is brought close to the target portion 101 at step S1-3, and force control is performed according to contact between the processing tool and the target portion 101 at step S1-4, for example, whereby the same effects as those described above are attained.

Moreover, at step S1-6, the controller 21 may perform, as the first abnormality addressing operation, stopping of the motor 2a of the conveying apparatus 2, deceleration of the motor 2a of the conveying apparatus 2, or the like.

Furthermore, instead of use of the operation position detection device 2b, the detection apparatus 40 may monitor the position of a predetermined mark, etc. on the conveying apparatus 2. In this case, the movement amount of the object 100 on the conveying apparatus 2 is sequentially detected on the basis of movement of the predetermined mark on the conveying apparatus 2. Alternatively, by use of any other known method, the movement amount of the object 100 on the conveying apparatus 2 may be sequentially detected.

In the present embodiment, the force sensor 32 is attached to the end portion of the robot 10. However, the force sensor 32 may be disposed between the conveying apparatus 2 and the object 100, or inside the object 100, for example. Also in this case, since force control based on the value detected by the force sensor 32 can be performed, the same effects as those described above are attained.

Moreover, at step S1-3, the controller 21 can set a reference coordinate system for the robot 10 by using information about the position of the target portion 101 and the value detected by the operation position detection device 2b. Image data taken by the detection apparatus 40 can be used as the information about the position of the target portion 101. When the target portion 101 exists in the image data, the controller 21 can specify the position and the orientation of the target portion 101 on the basis of the image data. In this case, control not using the tracking coordinate system TF' can be performed.

The following aspects are derived from the above disclosure.

A work robot system according to one aspect of the present invention includes a conveying apparatus that conveys an object; a robot that performs a predetermined task on a target portion of the object being conveyed by the conveying apparatus; a controller that controls the robot; a movement amount detector that detects a movement amount of the object moved by the conveying apparatus; and a force detector that detects a force generated by contact between a part or a tool supported by the robot and the object, wherein when the predetermined task is performed by the robot, the controller performs force control based on a value detected by the force detector while performing control of the robot by using information about a position of the target portion and a value detected by the movement amount detector.

According to the aforementioned aspect, the robot is controlled by using the information about the position of the target portion in the object on the conveying apparatus and the detected value of the movement amount of the object moved by the conveying apparatus. Accordingly, even in a state where no force control is performed, the controller can recognize the positional relationship between the part or the tool supported by the robot and the object, and, in some cases, can recognize whether or not the part or tool and the object are in contact with each other. For example, in the state where no force control is performed, an abnormality in the conveying apparatus in which the movement amount of the object moved by the conveying apparatus greatly varies, can be recognized by the controller. Consequently, prevention of any damage to the robot, the conveying apparatus, the object, and the like can be implemented without the necessity of forcibly shortening the control cycle of force control. Also, occurrence of oscillation of the robot can be suppressed.

In the aforementioned aspect, the controller preferably moves, in a conveying direction of the conveying apparatus, a coordinate system having information about the position of the target portion according to the value detected by the movement amount detector, and the controller preferably performs the force control by using the value detected by the force detector, while causing the part or the tool on the robot to follow the target portion by use of the coordinate system being moved.

As described above, the coordinate system having information about the position of the target portion is moved according to the movement amount of the object moved by the conveying apparatus, and the robot is controlled by use of the coordinate system being moved. Accordingly, the controller can easily, reliably cause the part or the tool supported by the robot to follow the target portion. Consequently, when the robot performs the predetermined task, the controller can precisely control the position and the orientation of the part or the tool supported by the robot, with respect to the target portion of the object being transferred by the conveying apparatus. This brings an advantage for prevention of any damage to the robot, the conveying apparatus, the object, and the like, without involving shortening of the control cycle of force control or enhancement of the sensitivity, and also brings an advantage for suppression of occurrence of oscillation of the robot.

In the aforementioned aspect, the system preferably includes a detector that detects at least the position of the target portion in the object on the conveying apparatus, and the controller sets the coordinate system having information about the position of the target portion, by using a detection result by the detector.

For example, when the detector is a two-dimensional camera, the detection result by the detector is image data. In this case, the controller sets the coordinate system having information about the position of the target portion, by using the image data. That is, the controller sets the origin and the direction of the coordinate system, with respect to the target portion in the image data. That is, the position of the target portion is fixed with respect to the coordinate system. When the coordinate system is set in this way, the position and the orientation of the part or the tool supported by the robot are precisely controlled with respect to the target portion being moved.

In the aforementioned aspect, the detector preferably detects the position and an orientation of the target portion in the object on the conveying apparatus, and the controller preferably sets the coordinate system having information about the position and the orientation of the target portion, by using a detection result by the detector.

For example, when the detector is a two-dimensional camera, the detection result by the detector is image data. In this case, the controller sets the coordinate system having information about the position and the orientation of the target portion, by using the image data. That is, the controller sets the origin and the direction of the coordinate system, with respect to the target portion in the image data. That is, the position and the orientation of the target portion are fixed with respect to the coordinate system. When the coordinate system is set in this way, the position and the orientation of the part or the tool supported by the robot are precisely controlled with respect to the target portion being moved.

In the aforementioned aspect, when variation of the value detected by the movement amount detector exceeds a predetermined reference, at least one of the controller and the conveying apparatus preferably performs an abnormality addressing operation.

According to this aspect, in a state where the positional relationship between the part or the tool supported by the robot and the object has been recognized as described above, the controller further performs the abnormality addressing operation on the basis of the value detected by the movement amount detector. This configuration brings an advantage for reliable prevention of any damage to the robot, the conveying apparatus, the object, and the like, and also brings an advantage for suppression of occurrence of oscillation of the robot.

According to the above aspects, prevention of any damage to a robot, a conveying apparatus, an object, and the like can be efficiently implemented.

REFERENCE SIGNS LIST 1 work robot system
2 conveying apparatus
2a motor
2b operation position detection device
3 roller
10 robot
11 servomotor
20 control apparatus
21 controller
22 display device
23 storage unit
23a system program
23b operation program
23c tracking program
23d force control program
24 servo controller
25 servo controller
26 input unit
30 hand
31 servomotor
32 force sensor
40 detection apparatus
50 sensor
100 object
101 target portion
101a hole
110 part
111 attachment portion
111a shaft

The invention claimed is:

1. A work robot system comprising:
a conveying apparatus that conveys an object;
a robot that performs a predetermined task on a target portion of the object being conveyed by the conveying apparatus;
a controller that controls the robot;
a movement amount detector that detects a movement amount of the object moved by the conveying apparatus; and
a force detector that detects a force generated by contact between a part or a tool supported by the robot and the object, wherein
when the predetermined task is performed by the robot, the controller performs force control based on a value detected by the force detector while performing control of the robot by using information about a position of the target portion and a value detected by the movement amount detector; and
the controller is configured to shorten a control cycle of force control or enhance sensitivity of the force control when the value detected by the movement amount detector varies to exceed a predetermined reference.

2. The work robot system according to claim 1, wherein
the controller moves, in a conveying direction of the conveying apparatus, a coordinate system having information about the position of the target portion according to the value detected by the movement amount detector, and
the controller performs the force control by using a value detected by the force detector, while the part or the tool on the robot is caused to follow the target portion by use of the coordinate system being moved.

3. The work robot system according to claim 2, further comprising
a detector that detects at least the position of the target portion in the object on the conveying apparatus, wherein
the controller sets the coordinate system having information about the position of the target portion, by using a detection result obtained by the detector.

4. The work robot system according to claim 2, wherein
the detector detects the position and an orientation of the target portion in the object on the conveying apparatus, and
the controller sets the coordinate system having information about the position and the orientation of the target portion, by using a detection result obtained by the detector.

5. The work robot system according to claim 1, wherein
when variation of the value detected by the movement amount detector exceeds the predetermined reference, the conveying apparatus performs an abnormality addressing operation.

* * * * *